(12) United States Patent
Tabatabaei Yazdi et al.

(10) Patent No.: US 9,253,809 B2
(45) Date of Patent: Feb. 2, 2016

(54) APPARATUS AND METHODS FOR IMPROVED USER EQUIPMENT (UE) CAPABILITY SIGNALING

(71) Applicant: QUALCOMM Incorporated, San Diego, CA (US)

(72) Inventors: Seyed Mohammadsadegh Tabatabaei Yazdi, San Diego, CA (US); Xipeng Zhu, Beijing (CN); Francesco Pica, San Diego, CA (US); Sharad Deepak Sambhwani, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 14/024,382

(22) Filed: Sep. 11, 2013

(65) Prior Publication Data

US 2014/0098756 A1    Apr. 10, 2014

Related U.S. Application Data

(60) Provisional application No. 61/710,341, filed on Oct. 5, 2012.

(51) Int. Cl.
| | |
|---|---|
| H04W 76/02 | (2009.01) |
| H04W 4/00 | (2009.01) |
| H04W 74/00 | (2009.01) |
| H04W 74/08 | (2009.01) |
| H04W 8/22 | (2009.01) |

(52) U.S. Cl.
CPC ............ *H04W 76/021* (2013.01); *H04W 4/005* (2013.01); *H04W 74/006* (2013.01); *H04W 76/02* (2013.01); *H04W 8/22* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 8,472,966 B2 | 6/2013 | Franceschini et al. | |
| 2009/0201864 A1* | 8/2009 | Ahluwalia | 370/329 |
| 2010/0159919 A1* | 6/2010 | Wu | 455/424 |
| 2010/0330959 A1 | 12/2010 | Mildh et al. | |
| 2011/0177814 A1* | 7/2011 | Buchmayer et al. | 455/435.1 |
| 2011/0230199 A1* | 9/2011 | Patabandi et al. | 455/450 |
| 2012/0109912 A1 | 5/2012 | Donze et al. | |

(Continued)

FOREIGN PATENT DOCUMENTS

| | | |
|---|---|---|
| CN | 102387495 A | 3/2012 |
| CN | 102447546 A | 5/2012 |

(Continued)

OTHER PUBLICATIONS

Ericsson, "Handling of UE capability information in SAE/LTE," 3GPP TSG-RAN WG2 #57-bis, St. Julian, Malta, pp. 1-4, Mar. 26-30, 2007, TDOC R2-071328.

(Continued)

*Primary Examiner* — Edan Orgad
*Assistant Examiner* — Saumit Shah
(74) *Attorney, Agent, or Firm* — Arent Fox LLP

(57) ABSTRACT

A method of random access in wireless communications that includes transmitting a radio resource control (RRC) connection request message, receiving an RRC connection setup message, and transmitting a modified RRC connection setup complete message that does not include at least a portion of a user equipment (UE) capability.

18 Claims, 9 Drawing Sheets

(56) References Cited

U.S. PATENT DOCUMENTS

2012/0208537 A1   8/2012   Edge et al.
2012/0307784 A1   12/2012  Heden et al.

FOREIGN PATENT DOCUMENTS

WO   WO-2009009195 A2   1/2009
WO   WO-2011119680 A2   9/2011

OTHER PUBLICATIONS

3rd Generation Partnership Project; Technical Specification Group Radio Access Network; Radio Resource Control (RRC); Protocol specification (Release 11), 3GPP Draft; 25331-B30, 3rd Generation Partnership Project (3GPP), Mobile Competence Centre; 650, Route Des Lucioles; F-06921 Sophia-Antipolis Cedex; France Sep. 25, 2012, XP050664354.
International Search Report and Written Opinion—PCT/US2013/059437—ISA/EPO—Jan. 21, 2014.

\* cited by examiner

APPARATUS AND METHODS FOR IMPROVED USER EQUIPMENT (UE) CAPABILITY SIGNALING

CLAIM OF PRIORITY UNDER 35 U.S.C. §119

The present Application for Patent claims priority to U.S. Provisional Application No. 61/710,341 entitled "UE TYPE/CAPABILITY SIGNALING OPTIMIZATION FOR M2M APPLICATIONS" filed Oct. 5, 2012, and assigned to the assignee hereof and hereby expressly incorporated by reference herein.

BACKGROUND

1. Field

Aspects of the present disclosure relate generally to wireless communication systems, and more particularly to apparatus and methods for improved user equipment (UE) capability signaling.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In the current 3GPP HSPA standards, at radio resource control (RRC) connection setup, a user equipment (UE) sends UE radio access capability information as part of the RRC setup complete message to the radio network controller (RNC). UE capability information includes UE radio capabilities, UE non-access stratum (NAS) capabilities, and Classmark information. UE radio capabilities include UE GSM/enhanced data rates for GSM evolution (EDGE) radio access network (GERAN) capability, UE UTRAN capability (includes dynamic security parameters START_PS, START_CS, FRESH_PS) and UE evolved universal terrestrial radio access network (E-UTRAN) capability. UE NAS capabilities include UE network capability and mobile switching (MS) network capability. Classmark information is used for circuit switched (CS) domain which may not be applicable to machine type communication (MTC) devices. In the existing standard, UE reports radio capability at each RRC connection establishment. Also, in addition to the full set of UE radio capability information sent in the RRC connection setup complete message (which may be used for the proper set up of data radio bearers and measurement control configuration), the UE also reports a small set of capabilities in the RRC connection request message (e.g., as initial information to the RNC to properly setup signaling radio bearers). The size of the UE capability information sent in the RRC setup complete message may vary between 124 bytes and 625 bytes in the current 3GPP standard. For an MTC device with a comparable size of data to send (or receive) in each RRC connection, the signaling overhead due to the UE capability information is very large. As such, in order to reduce the radio signaling overhead and also increase the battery life of the UEs, it is desirable to reduce the number of signaling messages sent over the radio interface for machine-to-machine (M2M) and MTC UEs and applications. Furthermore, number of MTC devices in each cell can be very large, and therefore by optimizing the UE signaling messages over the air, both the UE and the UTRAN may benefit.

As the demand for mobile broadband access continues to increase, research and development continue to advance the UMTS technologies not only to meet the growing demand for mobile broadband access, but to advance and enhance the user experience with mobile communications. Thus, in this case, there is a desire to reduce the signaling messages in UE capability signaling.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of random access in wireless communications is provided that includes transmitting a radio resource control (RRC) connection request message, receiving an RRC connection setup message, and transmitting a modified RRC connection setup complete message that does not include at least a portion of a user equipment (UE) capability.

In another aspect, a UE is provided that includes means for transmitting an RRC connection request message, means for receiving an RRC connection setup message, and means for transmitting a modified RRC connection setup complete message that does not include at least a portion of a UE capability.

In yet another aspect, a computer program product operable by a UE is provided that includes a computer-readable medium, including code executable by a computer to transmit an RRC connection request message, code executable by the computer to receive an RRC connection setup message, and code executable by the computer to transmit a modified RRC connection setup complete message that does not include at least a portion of a UE capability.

In a further aspect, a UE is provided that includes an RRC connection set up component configured to transmit an RRC connection request message, receive an RRC connection setup message, and transmit a modified RRC connection setup complete message that does not include at least a portion of a UE capability.

These and other aspects of the invention will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
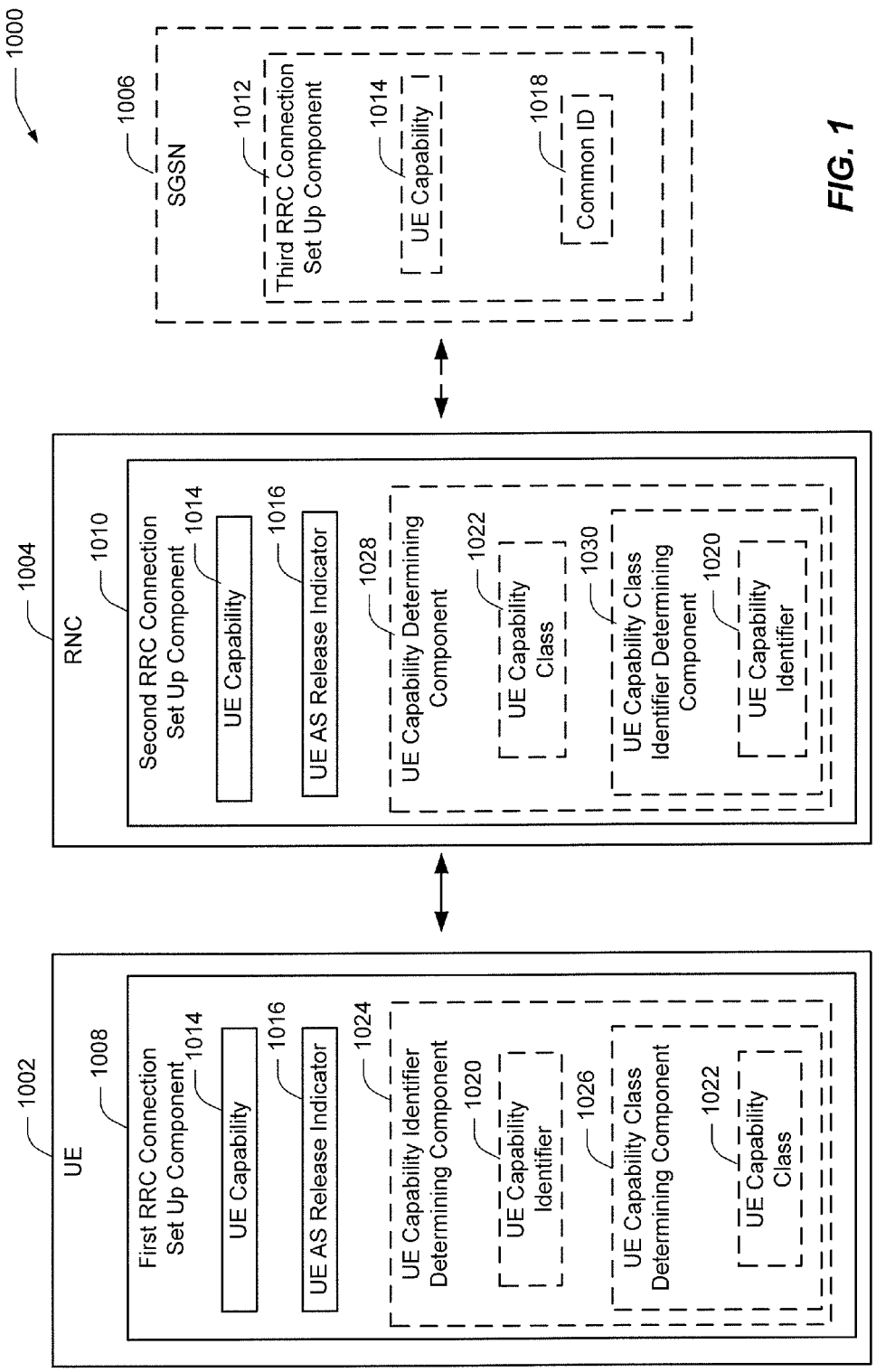
FIG. 1 is a schematic block diagram of one aspect of a system for improved UE capability signaling.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure may reduce the number of signaling messages needed for reporting UE capability information.

In some aspects, for example, the dynamic security parameters are maintained in the RRC connection setup complete message while the reporting of the UE capability information is improved.

In some aspects, for example, the UE does not include at least a portion of the UE capability information in the RRC connection setup complete message. For example, in one aspect, the UE does not include any UE capability information in the RRC connection setup complete message. In this case, for example, the UE reports a UE capability identifier to the RNC, and the RNC resolves the identifier by mapping the identifier to a combination of UE capabilities in order to acquire the UE capability information.

In some other alternative or complementary aspects, for example, the serving GPRS support node (SGSN) buffers UE capability information, e.g., UE radio capability, as provided by the UTRAN, when the UE first connects to the core network (e.g. at the initial registration), and conveys the stored UE capability information back to the UTRAN every time the UE sets up an RRC connection request (e.g., after the initial registration). In this case, for example, if the SGSN does not have the UE radio capability information (e.g. when the UE accesses the SGSN for the first time), the RNC queries the UE to report full capability information bits to the RNC, and the RNC then uploads the UE radio capability in the SGSN.

In some aspects, for example, where the UE reports a UE capability identifier to the RNC, in order to perform the mapping between the UE capability identifier and the UE radio capabilities at the UE and also at the RNC, a number of MTC UE capability classes may be provided (e.g., 16 UE capability classes, each coded by 4 bits). Such classification may be different per access stratum (AS) release. Accordingly, in these aspects, in an RRC connection request, UE may report the AS release indicator and the short length (e.g., 4 bit) UE capability identifier to the RNC. Then, the RNC may derive the full UE radio access capability based on an internal database (e.g., by mapping a specific UE class per AS release indicator and UE capability indicator).

In some aspects, for example, where the SGSN is configured to store the UE capability information such as UE radio capability information, the UE does not include UE radio access capabilities in the RRC Connection Setup Complete message. In these aspects, if the SGSN has the UE radio capability information, the SGSN provides the UE radio capabilities to the RNC by sending, e.g., UE capability messages. In these aspects, if the SGSN does not provide the UE capability messages to the RNC, then the RNC enquiries the UE radio access capability information from the UE. Accordingly, in these aspects, when the RNC gets the UE radio capability from the UE, the RNC uploads the UE radio capability to the SGSN. In some aspects, in order to upload the UE radio capability to the SGSN, a new radio access network application part (RANAP) message "UE Capability Upload" is added.

The above aspects may be alternative or complementary to each other. For example, in some aspects, a UE capability indicator may be used by the UE to report its capability when queried by the RNC.

Accordingly, in some alternative or complementary aspects of the present disclosure, a UE may use a short length identifier to represent the UE capability, and may send the identifier to the RNC during an RRC connection request, where the capability identifier is mapped, by both the UE and the RNC, to a specific UE capability class that may depend on an AS release. In some other alternative or complementary aspects of the present disclosure, the UE capability is stored in the SGSN and is re-used for future connections. In these aspects, the UE sends the UE capability to the RNC if queried by the RNC.

Figure 2:
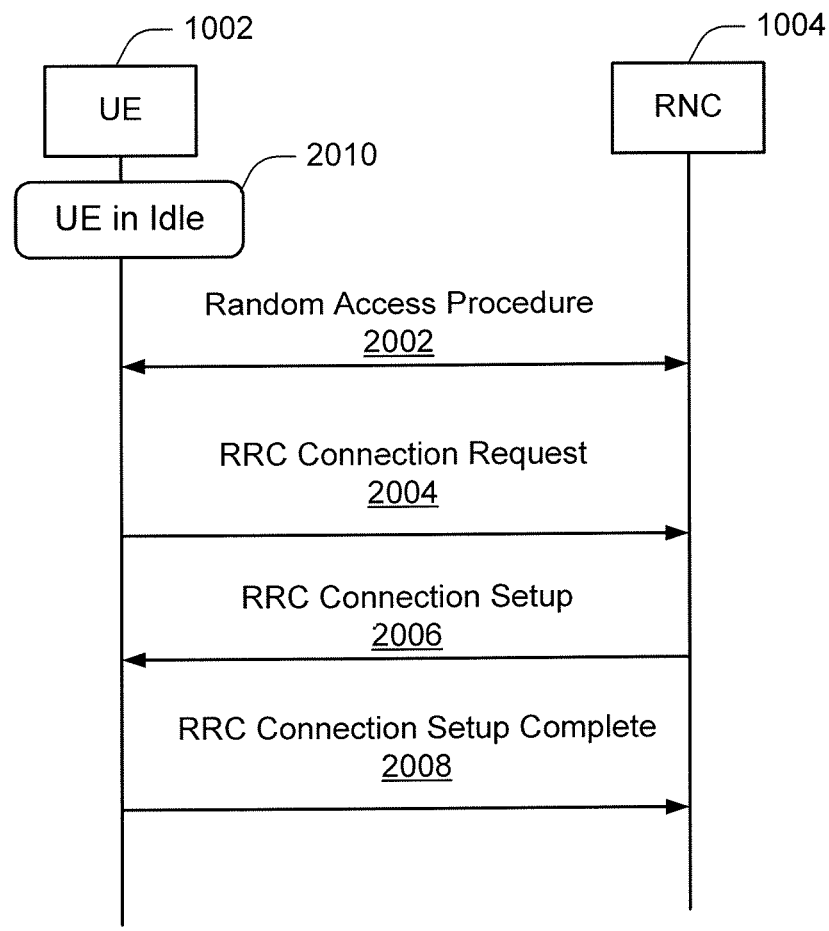
FIGS. 2, 3, and 4 are example diagrams illustrating aspects of UE capability messaging, including aspects of the system of FIG. 1.

Referring to FIG. 1, in one aspect, a wireless communication system 1000 includes UE 1002 that is communicating with RNC 1004 to set up an RRC connection. In some aspects, UE 1002 and RNC 1004 include first RRC connection set up component 1008 and second RRC connection set up component 1010, respectively, that communicate with each other to set up an RRC connection. The messaging that is conventionally performed between UE 1002 (or first RRC connection set up component 1008) and RNC 1004 (or second RRC connection set up component 1010) in order to set up an RRC connection is shown in FIG. 2, where, during a random access procedure 2002, UE 1002 (that may have previously been in an idle mode 2010) sends RRC connection request message 2004 to RNC 1004, RNC 1004 follows by sending RRC connection setup message 2006 to UE 1002, and UE 1002 follows by sending RRC connection setup complete message 2008 to RNC 1004.

Conventionally, RRC connection request message 2004 may include a series of UE radio capability bits comprising UE capability 1014 of UE 1002, and an AS release indicator 1016 indicative of an AS release of UE 1002. Also, conventionally, RRC connection setup complete message 2008 may include START_PS, UE radio capability, and inter-radio access technology (RAT) UE capabilities. In some aspects, UE capability 1014 may include UE radio capabilities, UE non-access stratum (NAS) capabilities, and Classmark information. In some aspects, UE radio capabilities include UE GSM/enhanced data rates for GSM evolution (EDGE) radio access network (GERAN) capability, UE UTRAN capability (includes dynamic security parameters START_CS, START_CS, FRESH_PS) and UE evolved universal terrestrial radio access network (E-UTRAN) capability. In some aspects, UE NAS capabilities include UE network capability and mobile switching (MS) network capability. In some aspects, Classmark information is used for circuit switched (CS) domain which may not be applicable to MTC devices.

Conventionally, UE 1002 reports UE capability 1014 at each RRC connection establishment. Also, in addition to the full set of UE capability 1014 sent in RRC connection setup complete message 2008 (which may be used for the proper set up of data radio bearers and measurement control configuration), UE 1002 also reports a small set of capabilities in RRC connection request message 2004 (e.g., as initial information to RNC 1004 to properly setup signaling radio bearers). In some aspects, the size of UE capability information sent in RRC connection setup complete message 2008 may vary between, e.g., 124 bytes and 625 bytes in the current 3GPP standard. In some aspects, for example, for a machine type communication (MTC) device with a comparable size of data to send (or receive) in each RRC connection, the signaling overhead due to reporting UE capability 1014 may be large.

Figure 3:
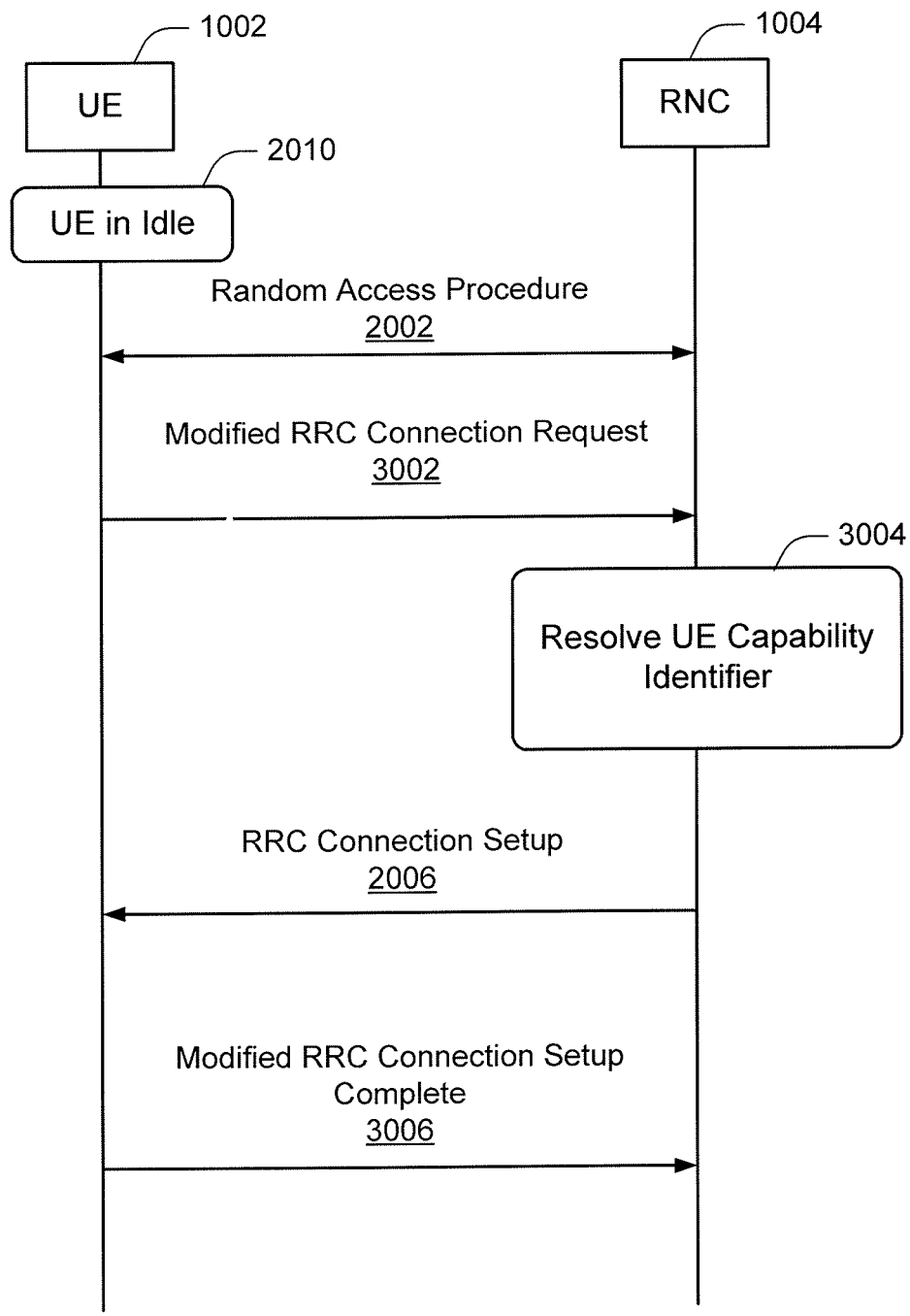

Aspects of the present disclosure provide improved UE radio capability signaling. In some aspect, for example, first RRC connection set up component 1008 may not include at least a portion of UE capability 1014 in an RRC connection set up complete message to RNC 1004. For example, in one aspect, first RRC connection set up component 1008 does not include any portion of UE capability 1014 in the RRC connection set up complete message to RNC 1004. In some aspects, for example, first RRC connection set up component 1008 may include UE capability identifier determining component 1024 that determines a short length UE capability identifier 1020 based on UE capability 1014 and/or UE AS release indicator 1016. In these aspects, as shown in the example signaling diagram of FIG. 3, UE 1002 may report UE capability 1014 by reporting the short length UE capability identifier 1020 to RNC 1004 during a modified RRC connection request message 3002. Accordingly, in these aspects, UE capability 1014 is not reported in modified RRC connection set up message 3006. In these aspects, as shown in block 3004 of FIG. 3, RNC 1004 can resolve UE capability identifier 1002 by mapping it to, e.g., a specific combination of UE capabilities comprising UE capability 1014.

In one aspect, for example, at least a portion of UE capability 1014 is not reported in modified RRC connection set up message 3006 and UE 1002 reports UE capability 1014 by reporting the short length UE capability identifier 1020 only if UE 1002 is an MTC device or a delay tolerant device.

In some aspects, UE capability identifier determining component 1024 may further include UE capability class determining component 1026 that determines UE capability class 1022 based on UE capability 1014 and/or UE AS release indicator 1016. In these aspects, UE 1002 and RNC 1004 can map UE capability identifier 1002 to a specific UE capability class 1022. For example, in one aspect, such mapping defines a number of MTC UE capability classes, for example, 16 different types of UE classes, each coded by 4 bits, where such classification may be different per AS release. Accordingly, in these aspects, in modified RRC connection request 3002, UE 1002 reports UE AS release indicator 1016 and a small number of bits comprising UE capability identifier 1020, e.g., a 4 bit UE capability identifier 1020, to RNC 1004. Then, as shown in block 3004 of FIG. 3, RNC 1004 derives the UE radio access capability information by mapping the received UE AS release indicator 1016 and UE capability indicator 1020 to UE capability 1014 comprising UE radio access capability information. For example, in some aspects, second RRC connection set up component 1010 of RNC 1004 may include UE capability determining component 1028 that determines UE capability 1014 based on the received UE capability identifier 1020 and/or UE AS release indicator 1016. Further, in some aspects, for example, UE capability determining component 1028 may include UE capability class identifier determining component 1030 that determines UE capability class 1022 by mapping the received UE capability identifier 1020 and/or UE AS release indicator 1016 to UE capability class 1022. In these aspects, UE capability determining component 1028 determines UE capability 1014 by mapping UE capability class 1022 and/or UE AS release indicator 1016 to UE capability 1014.

In some aspects of the present disclosure, alternatively or additionally, UE capability 1014 may be buffered at the serving general packet radio service (GPRS) support node (SGSN) 1006. For example, in some aspects, when UE 1002 first connects to the core network (e.g. at initial registration), UE capability 1014 may be buffered at SGSN 1006, and SGSN 1006 may later convey the stored UE capability 1014 back to UTRAN (e.g., to RNC 1004) every time UE 1002 sets up an RRC connection request after the initial registration. For example, in some aspects, SGSN 1006 may include third RRC connection set up component 1012 that buffers UE capability 1014 and conveys the stored UE capability 1014 back to second RRC connection set up component 1010 of RNC 1004. In some aspects, if SGSN 1006 does not have UE capability 1014 (e.g. when UE 1002 accesses the network for the first time), RNC 1004 queries UE 1002 to report full capability information bits comprising UE capability 1014. RNC 1004 then uploads UE capability 1014 in SGSN 1006. Accordingly, UE capability 1014 is stored in SGSN 1006 and is re-used for future connections, and UE 1002 sends UE capability 1014 to RNC 1004 only if queried by RNC 1004.

Figure 4:
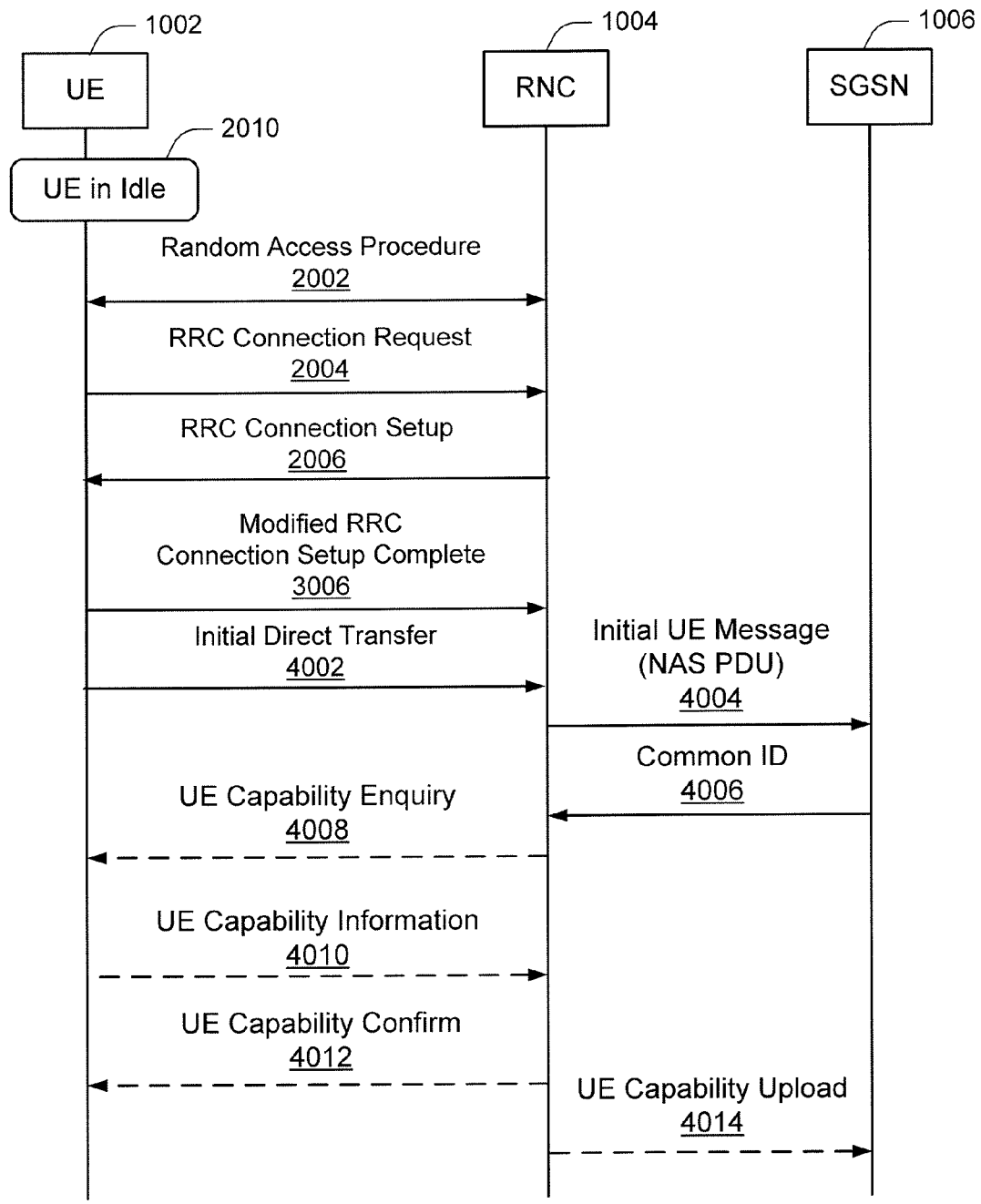

In some aspects, for example, as shown in FIG. 4, UE 1002 does not include at least a portion of UE capability 1014 in modified RRC connection setup complete message 3006. For example, in one aspect, UE 1002 does not include any portion of UE capability 1014 in modified RRC connection set up complete message 3006. In these aspects, for example, SGSN 1006 may provide UE capability 1014 to RNC 1004 in common ID message 4006. In some aspects, if SGSN 1006 does not provide UE capability 1014 to RNC 1004 in common ID message 4006, then RNC 1004 sends UE capability enquiry message 4008 to UE 1002 to query UE 1002 to report UE capability 1014. In some aspects, UE 1002 responds to UE capability enquiry message 4008 by sending UE capability information message 4010 to RNC 1004. Then, RNC 1004 sends UE capability confirm message 4012 back to UE 1002, and uploads UE capability 1014 to SGSN 4014 by sending UE capability upload message 4014 to SGSN 1006. In some aspects, UE capability upload message 4014 is configured as a radio access network application part (RANAP) message.

The above aspects may be alternative or complementary to each other. For example, UE capability indicator 1020 may be used by UE 1002 to report capability information when queried by the RNC 1004, e.g., when RNC 1004 sends UE capability enquiry message 4008 to UE 1002 to query UE 1002 to report UE capability 1014.

Figure 5:
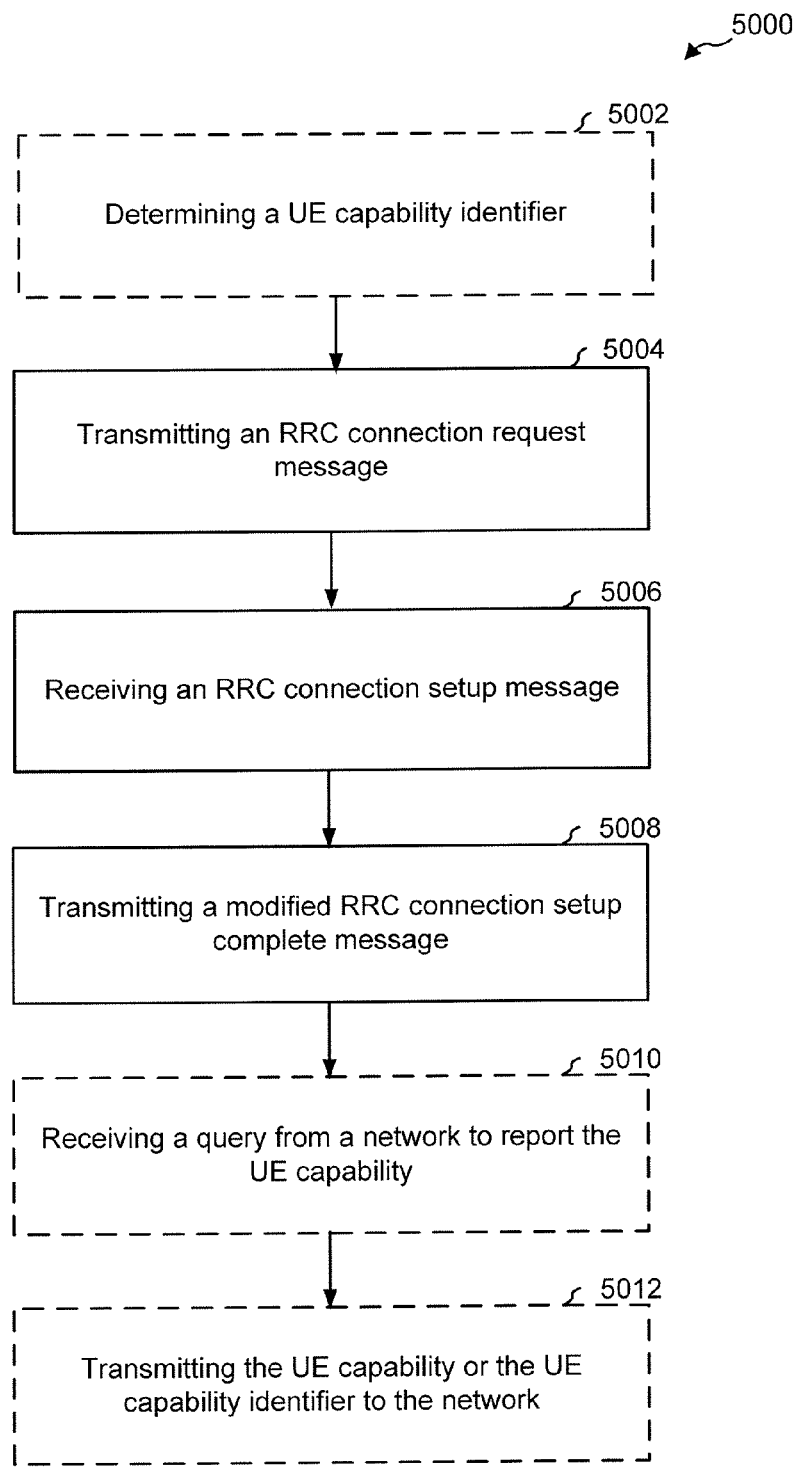
FIG. 5 is a flowchart of one aspect of a method of the system of FIG. 1.

Referring to FIG. 5, in one aspect, a method 5000 for improved UE radio capability signaling in random access is illustrated. For explanatory purposes, method 5000 will be discussed with reference to the above described FIGS. 1 and 2. It should be understood that in other implementations, other systems, UEs, and/or network components comprising different components than those illustrated in FIGS. 1-4 may be used in implementing method 5000 of FIG. 5.

At block 5004, method 5000 includes transmitting an RRC connection request message. For example, in an aspect, UE 1002 and RNC 1004 may include first RRC connection set up component 1008 and second RRC connection set up component 1010, respectively, that communicate with each other to set up an RRC connection. For example, during a random access procedure 2002, UE 1002 (that may have previously been in an idle mode 2010) sends RRC connection request message 2004 to RNC 1004.

Optionally, at block 5004, the transmitted RRC connection request message may include a UE capability identifier. Accordingly, method 5000 may optionally include block 5002 to determine a UE capability identifier based on the UE capability and an AS release of the UE, wherein the UE capability identifier and the AS release uniquely identify the UE capability. For example, in an aspect, first RRC connection set up component 1008 may include UE capability identifier determining component 1024 that determines a short length UE capability identifier 1020 based on UE capability 1014 and/or UE AS release indicator 1016. In these aspects, as shown in the example signaling diagram of FIG. 3, UE 1002 may report UE capability 1014 by reporting the short length UE capability identifier 1020 to RNC 1004 during a modified RRC connection request message 3002. In these aspects, RNC 1004 can resolve UE capability identifier 1002 by mapping it to, e.g., a specific combination of UE capabilities comprising UE capability 1014. In these aspects, UE capability identifier determining component 1024 may further include UE capability class determining component 1026 that determines UE capability class 1022 based on UE capability 1014 and/or UE AS release indicator 1016. In these aspects, UE 1002 and RNC 1004 can map UE capability identifier 1002 to a specific UE capability class 1022. For example, in one aspect, such mapping defines a number of MTC UE capability classes, for example, 16 different types of UE classes, each coded by 4 bits, where such classification may be different per AS release. Accordingly, in these aspects, in modified RRC connection request 3002, UE 1002 reports UE AS release indicator 1016 and a small number of bits comprising UE capability identifier 1020, e.g., a 4 bit UE capability identifier 1020, to RNC 1004. Then, as shown in block 3004 of FIG. 3, RNC 1004 derives the UE radio access capability information by mapping the received UE AS release indicator 1016 and UE capability indicator 1020 to UE capability 1014 comprising UE radio access capability information. For example, in some aspects, second RRC connection set up component 1010 of RNC 1004 may include UE capability determining component 1028 that determines UE capability 1014 based on the received UE capability identifier 1020 and/or UE AS release indicator 1016. Further, in some aspects, for example, UE capability determining component 1028 may include UE capability class identifier determining component 1030 that determines UE capability class 1022 by mapping the received UE capability identifier 1020 and/or UE AS release indicator 1016 to UE capability class 1022. In these aspects, UE capability determining component 1028 determines UE capability 1014 by mapping UE capability class 1022 and/or UE AS release indicator 1016 to UE capability 1014.

At block 5006, method 5000 includes receiving an RRC connection setup message. For example, in an aspect, after sending RRC connection request message 2004 to RNC 1004, UE 1002 or first RRC connection set up component 1008 receive RRC connection setup message 2006 from RNC 1004.

At block 5008, method 5000 includes transmitting a modified RRC connection setup complete message that does not include at least a portion of a UE capability. For example, in one aspect, modified RRC connection set up complete message does not include any portion of the UE capability. For example, in some aspects, upon receiving RRC connection setup message 2006 from RNC 1004, UE 1002 or first RRC connection set up component 1008 follow by sending RRC connection setup complete message 2008 to RNC 1004. In these aspects, first RRC connection set up component 1008 may not include at least a portion of UE capability 1014 in the RRC connection set up complete message 2008. In one aspect, for example, first RRC connection set up component 1008 does not include any portion of UE capability 1014 in the RRC connection set up complete message 2008.

Optionally, at block 5010, method 5000 may include receiving a query from a network to report the UE capability after transmitting the modified RRC connection setup complete message, wherein the network sends the query upon receiving a common ID message from a SGSN, wherein the common ID message does not include the UE capability. For example, in some aspects, as shown in FIG. 4, when UE 1002 does not include UE capability 1014 in modified RRC connection setup complete message 3006, SGSN 1006 may provide UE capability 1014 to RNC 1004 in common ID message 4006. If SGSN 1006 does not provide UE capability 1014 to RNC 1004 in common ID message 4006, then RNC 1004 sends UE capability enquiry message 4008 to UE 1002 to query UE 1002 to report UE capability 1014. In some aspects, UE 1002 responds to UE capability enquiry message 4008 by sending UE capability information message 4010 to RNC 1004. Then, RNC 1004 sends UE capability confirm message 4012 back to UE 1002, and uploads UE capability 1014 to SGSN 4014 by sending UE capability upload message 4014 to SGSN 1006. In some aspects, UE capability upload message 4014 is configured as an RANAP message. In these aspects, for example, when UE 1002 first connects to the core network (e.g. at initial registration), UE capability 1014 may be buffered at SGSN 1006, and SGSN 1006 may later convey the stored UE capability 1014 back to UTRAN (e.g., to RNC 1004) every time UE 1002 sets up an RRC connection request after the initial registration. For example, in some aspects, SGSN 1006 may include third RRC connection set up component 1012 that buffers UE capability 1014 and conveys the stored UE capability 1014 back to second RRC connection set up component 1010 of RNC 1004. In some aspects, if SGSN 1006 does not have UE capability 1014 (e.g. when UE 1002 accesses the network for the first time), RNC 1004 queries UE 1002 to report UE capability 1014.

Optionally, at block 5012, method 5000 may include transmitting the UE capability or the UE capability identifier to the network. For example, in some aspects, upon receiving the query at block 5010, UE 1002 may report full capability information bits comprising UE capability 1014. RNC 1004 then uploads UE capability 1014 in SGSN 1006. Accordingly, UE capability 1014 is stored in SGSN 1006 and is re-used for future connections, and UE 1002 sends UE capability 1014 to RNC 1004 only if queried by RNC 1004. In some aspects, upon receiving UE capability 1014, RNC 1004 uploads UE capability 1014 to SGSN 1006 by sending a UE capability upload message that is a RANAP message. Alternatively, when queried by RNC 1004, UE 1002 may report UE capability 1014 by sending UE capability identifier 1020 as described herein with reference blocks 5002.

The above aspects may be alternative or complementary to each other. For example, UE capability indicator 1020 may be used by UE 1002 to report capability information when queried by the RNC 1004, e.g., when RNC 1004 sends UE capability enquiry message 4008 to UE 1002 to query UE 1002 to report UE capability 1014.

Figure 6:
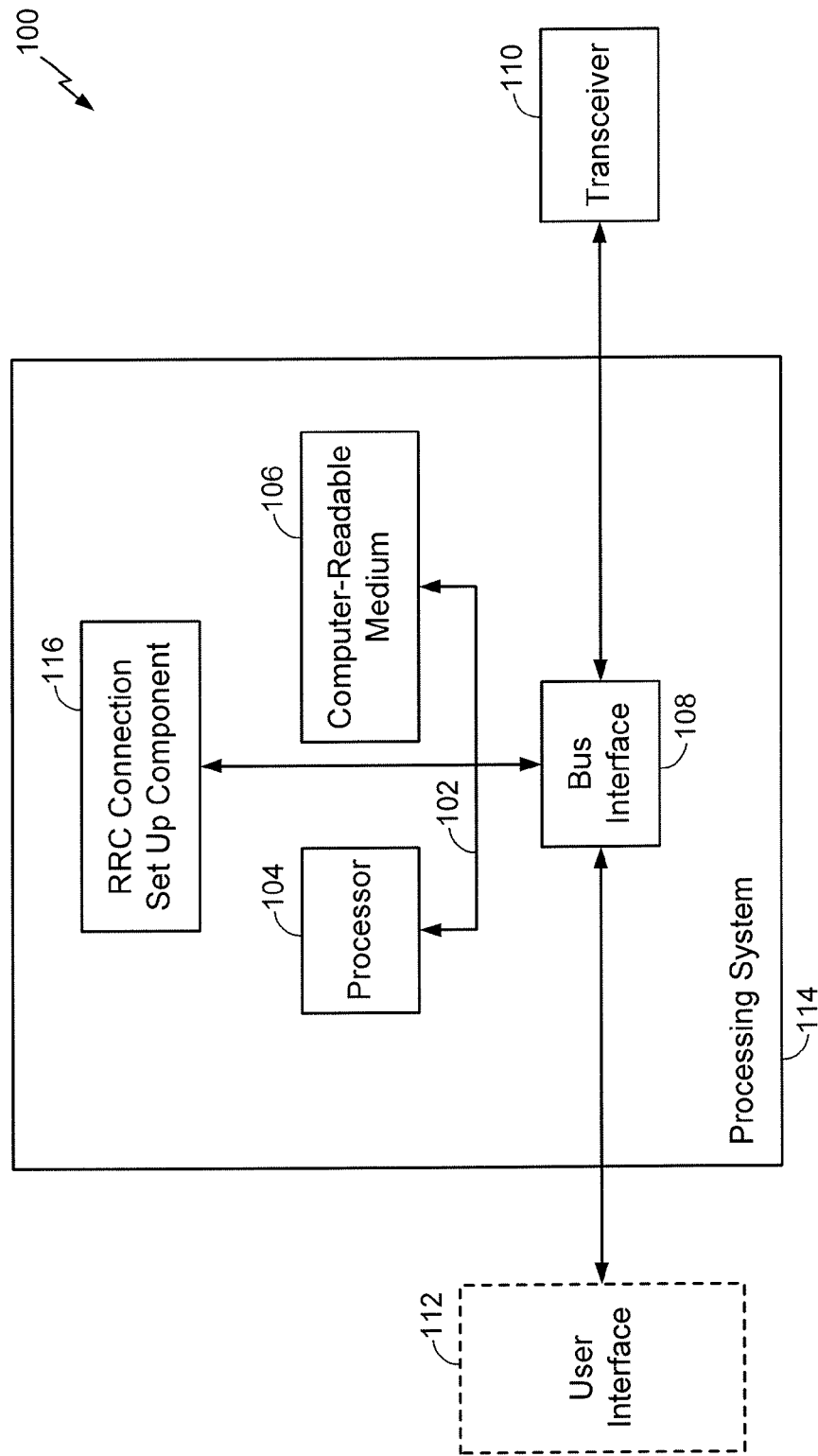
FIG. 6 is a diagram illustrating an example of a hardware implementation for an apparatus of FIG. 1 employing a processing system.

FIG. 6 is a conceptual diagram illustrating an example of a hardware implementation for an apparatus 100 employing a processing system 114 for operating UE 1002, RNC 1004, SGSN 1006, first RRC connection set up component 1008, second RRC connection set up component 1010, third RRC connection set up component 1012, or any components thereof (see FIG. 1). In some aspects, for example, apparatus 100 includes RRC connection set up component 116 which may be a respective one of first RRC connection set up component 1008, second RRC connection set up component 1010, or third RRC connection set up component 1012 (see FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. For example, in an aspect, apparatus 100 further includes RRC connection set up component 116 that is linked by bus 102 to other components of apparatus 100. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 7:
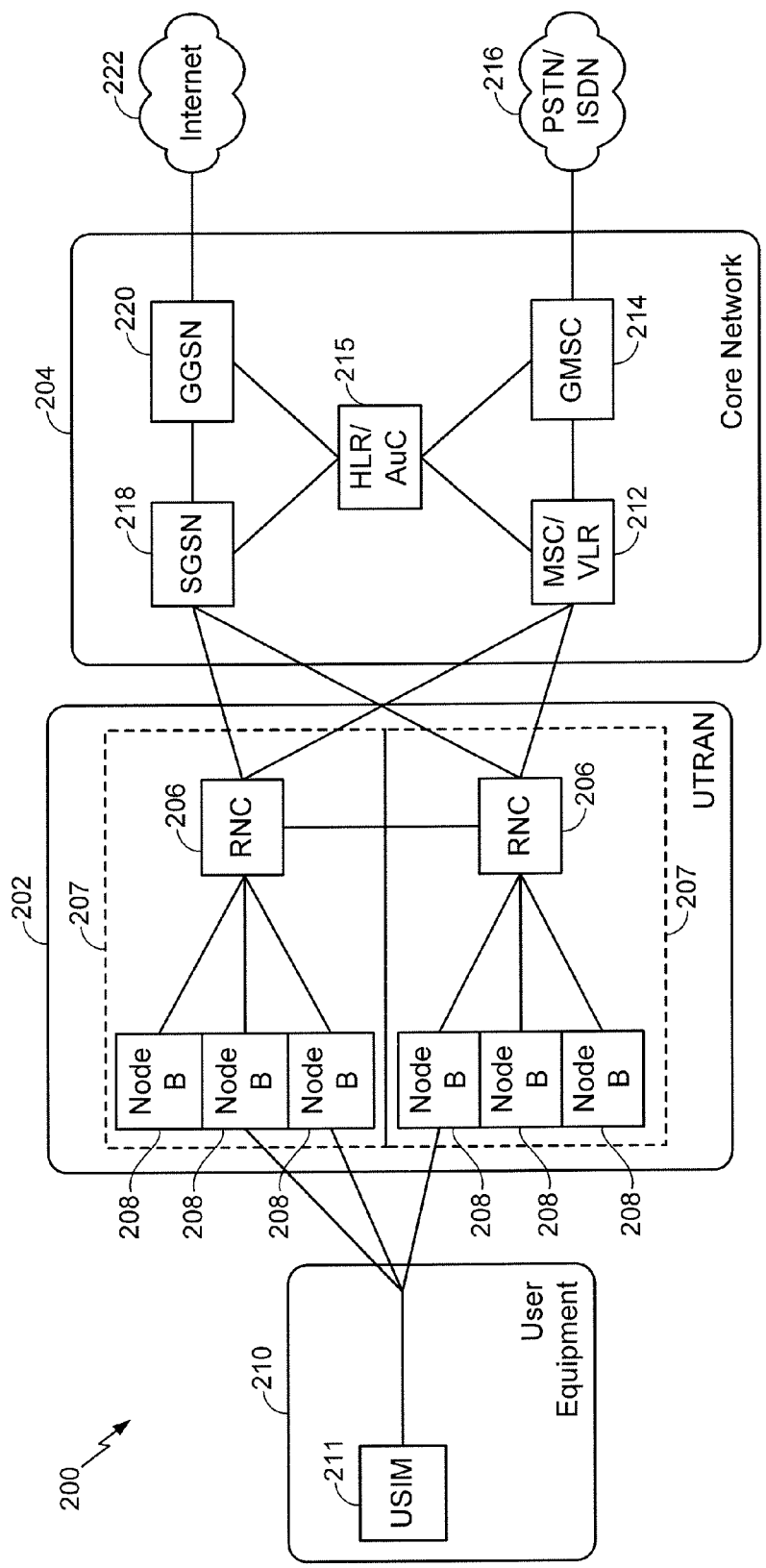
FIG. 7 is a block diagram conceptually illustrating an example of a telecommunications system including aspects of the system of FIG. 1.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 200 employing a W-CDMA air interface, where UMTS system 200 may include UE 1002, RNC 1004, SGSN 1006, first RRC connection set up component 1008, second RRC connection set up component 1010, third RRC connection set up component 1012, apparatus 100, or any components thereof (see FIGS. 1 and 6). A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
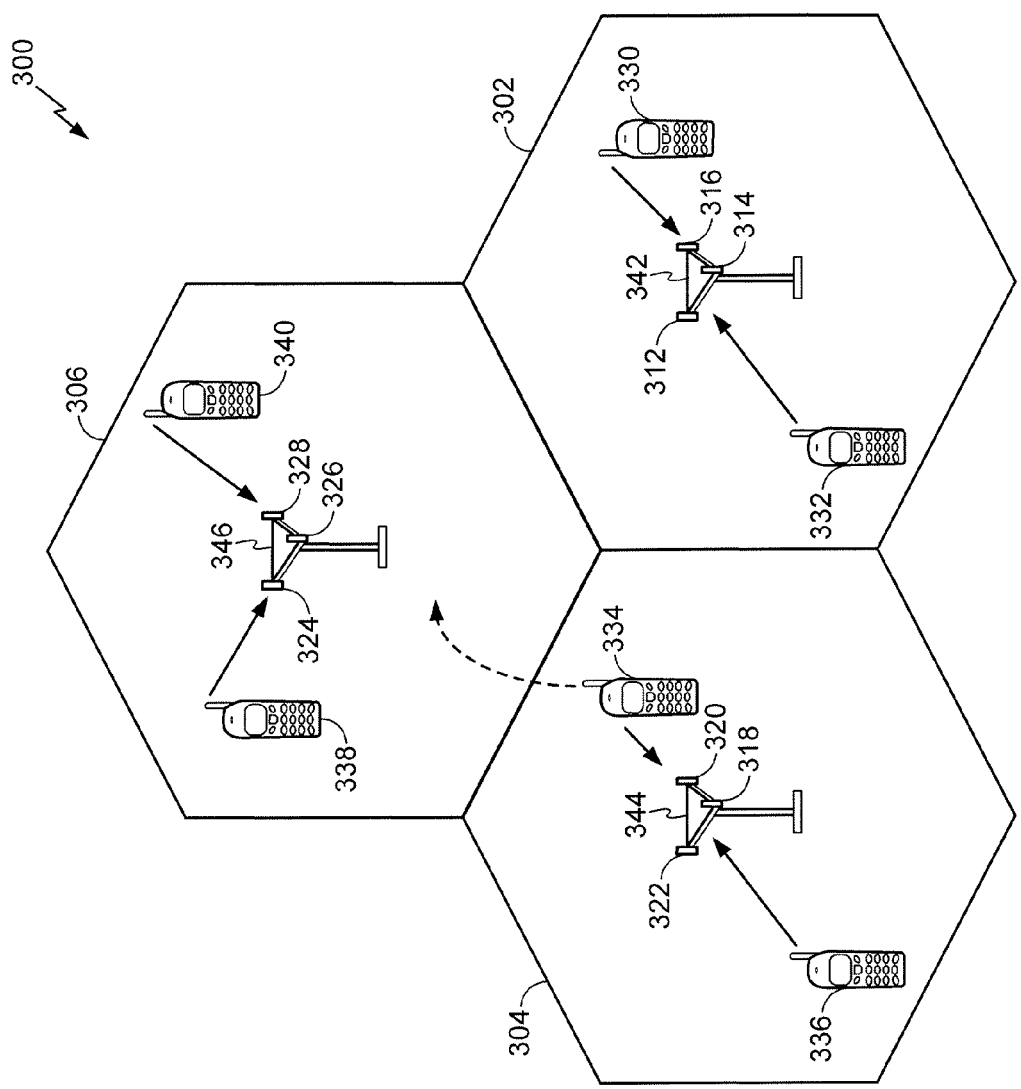
FIG. 8 is a conceptual diagram illustrating an example of an access network including aspects of the system of FIG. 1.

Referring to FIG. 8, an access network 300 in a UTRAN architecture is illustrated which may include UE 1002, 210, RNC 1004, 206, SGSN 1006, 218, first RRC connection set up component 1008, second RRC connection set up component 1010, third RRC connection set up component 1012, apparatus 100, or any components thereof (see FIGS. 1, 6, and 7). The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 7) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 7), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
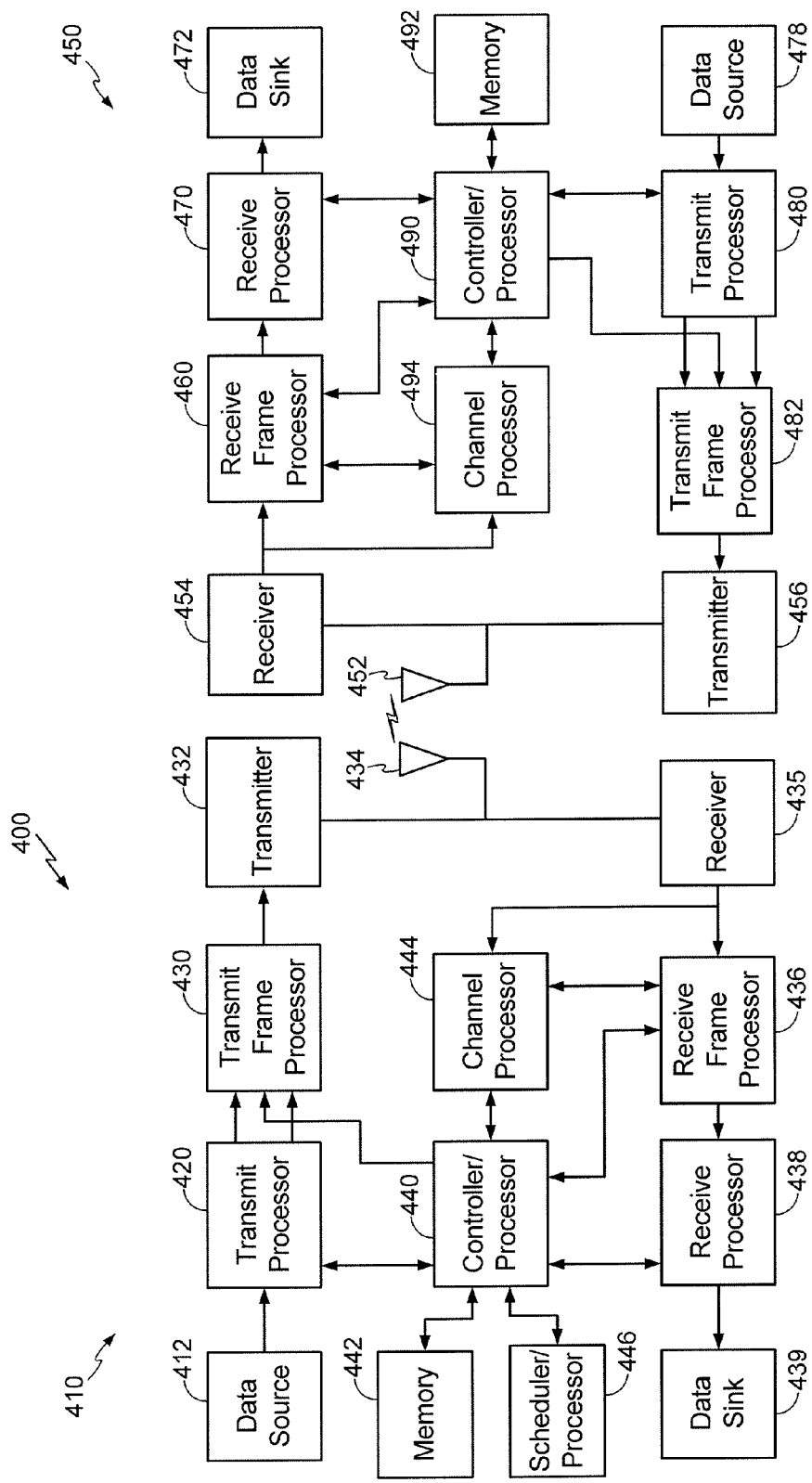
FIG. 9 is a block diagram conceptually illustrating an example of a Node B in communication with a UE in a telecommunications system, including aspects of the system of FIG. 1.

FIG. 9 is a block diagram of a Node B 410 in communication with a UE 450, where the Node B 410 and the UE 450 may include a respective one of UE 1002, 210, 330, 332, 334, 336, 338, 340, RNC 1004, 206, SGSN 1006, 218, first RRC connection set up component 1008, second RRC connection set up component 1010, third RRC connection set up component 1012, apparatus 100, or any components thereof (see FIGS. 1, 6, 7, and 8). In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of random access in wireless communications, comprising:
   determining a user equipment (UE) capability identifier based on a UE capability and an access stratum (AS) release of the UE, wherein the UE capability identifier and the AS release uniquely identify the UE capability;
   transmitting a radio resource control (RRC) connection request message;
   receiving an RRC connection setup message;
   transmitting a modified RRC connection setup complete message that does not include the UE capability; and
   receiving a query from a network to report the UE capability after transmitting the modified RRC connection setup complete message, wherein the network sends the query in response to the RRC connection request message not including the UE capability identifier and upon receiving a common identifier (ID) message from a serving general packet radio service (GPRS) support node (SGSN), and wherein the common ID message does not include the UE capability.

2. The method of claim 1 wherein the RRC connection request message includes the UE capability identifier to enable the network to derive the UE capability.

3. The method of claim 2, wherein the determining comprises:
   mapping the UE capability to a UE capability class within one or more UE capability classes corresponding to the AS release, wherein each UE capability class corresponds to a combination of one or more UE capabilities; and
   setting a class identifier of the UE capability class as the UE capability identifier, wherein the class identifier uniquely identifies the UE capability class.

4. The method of claim 3 wherein transmitting the modified RRC connection setup complete is configured to cause a network to determine the class identifier based on the UE capability identifier and the AS release and maps the UE capability class to the UE capability.

5. The method of claim 1, further comprising:
   transmitting the UE capability to the network, wherein the network uploads the UE capability to the SGSN.

6. The method of claim 5, wherein transmitting the UE capability to the network causes the network to upload the UE capability to the SGSN by sending a UE capability upload message to the SGSN, wherein the UE capability upload message is a radio access network application part (RANAP) message.

7. The method of claim 1, further comprising:
   transmitting the UE capability identifier to the network in response to receiving the query.

8. The method of claim 7, wherein the determining comprises:
   mapping the UE capability to a UE capability class within one or more UE capability classes corresponding to the AS release, wherein each UE capability class corresponds to a combination of one or more UE capabilities; and setting a class identifier of the UE capability class as the UE capability identifier, wherein the class identifier uniquely identifies the UE capability class, wherein the network determines the class identifier based on the UE capability identifier and maps the UE capability class to the UE capability, wherein the network uploads the UE capability to the SGSN.

9. A user equipment (UE), comprising:

means for determining a user equipment (UE) capability identifier based on a UE capability and an access stratum (AS) release of the UE, wherein the UE capability identifier and the AS release uniquely identify the UE capability;

means for transmitting a radio resource control (RRC) connection request message;

means for receiving an RRC connection setup message;

means for transmitting a modified RRC connection setup complete message that does not include the capability; and means for receiving a query from a network to report the UE capability after transmitting the modified RRC connection setup complete message, wherein the network sends the query in response to the RRC connection request message not including the UE capability identifier and upon receiving a common identifier (ID) message from a serving general packet radio service (GPRS) support node (SGSN), and wherein the common ID message does not include the UE capability.

10. A non-transitory computer-readable medium, including:

code executable by a computer to determine a user equipment (UE) capability identifier based on a UE capability and an access stratum (AS) release of the UE, wherein the UE capability identifier and the AS release uniquely identify the UE capability;

code executable by the computer to transmit a radio resource control (RRC) connection request message;

code executable by the computer to receive an RRC connection setup message;

code executable by the computer to transmit a modified RRC connection setup complete message that does not include the UE capability; and code executable by the computer to receive a query from a network to report the UE capability after transmitting the modified RRC connection setup complete message, wherein the network sends the query in response to the RRC connection request message not including the UE capability identifier and upon receiving a common identifier (ID) message from a serving general packet radio service (GPRS) support node (SGSN), and wherein the common ID message does not include the UE capability.

11. A user equipment (UE), comprising:

a radio resource control (RRC) connection set up component configured to:

determine a user equipment (UE) capability identifier based on a UE capability and an access stratum (AS) release of the UE, wherein the UE capability identifier and the AS release uniquely identify the UE capability;

transmit a radio resource control (RRC) connection request message;

receive an RRC connection setup message;

transmit a modified RRC connection setup complete message that does not include the UE capability; and receive a query from a network to report the UE capability after transmitting the modified RRC connection setup complete message, wherein the network sends the query in response to the RRC connection request message not including the UE capability identifier and upon receiving a common identifier (ID) message from a serving general packet radio service (GPRS) support node (SGSN), and wherein the common ID message does not include the UE capability.

12. The UE of claim 11, wherein the RRC connection request message includes the UE capability identifier to enable the network to derive the UE capability.

13. The UE of claim 12, wherein the RRC connection set up component is further configured to determine the UE capability identifier by:

mapping the UE capability to a UE capability class within one or more UE capability classes corresponding to the AS release, wherein each UE capability class corresponds to a combination of one or more UE capabilities; and setting a class identifier of the UE capability class as the UE capability identifier, wherein the class identifier uniquely identifies the UE capability class.

14. The UE of claim 13, wherein the RRC connection set up component is configured to transmit the modified RRC connection setup complete message to cause a network to determine the class identifier based on the UE capability identifier and the AS release and maps the UE capability class to the UE capability.

15. The UE of claim 11, wherein the RRC connection set up component is further configured to:

transmit the UE capability to the network, wherein the network uploads the UE capability to the SGSN.

16. The UE of claim 15, wherein the RRC connection set up component is further configured to transmit the UE capability to the network to cause the network to upload the UE capability to the SGSN by sending a UE capability upload message to the SGSN, wherein the UE capability upload message is a radio access network application part (RANAP) message.

17. The UE of claim 11, wherein the RRC connection set up component is further configured to:

transmit the UE capability identifier to the network in response to receiving the query.

18. The UE of claim 17, wherein the RRC connection set up component is further configured to determine the UE capability identifier by:

mapping the UE capability to a UE capability class within one or more UE capability classes corresponding to the AS release, wherein each UE capability class corresponds to a combination of one or more UE capabilities; and setting a class identifier of the UE capability class as the UE capability identifier, wherein the class identifier uniquely identifies the UE capability class, wherein the network determines the class identifier based on the UE capability identifier and the AS release and maps the UE capability class to the UE capability, wherein the network uploads the UE capability to the SGSN.

* * * * *